Figures 1, 2, 3, 4, 5:
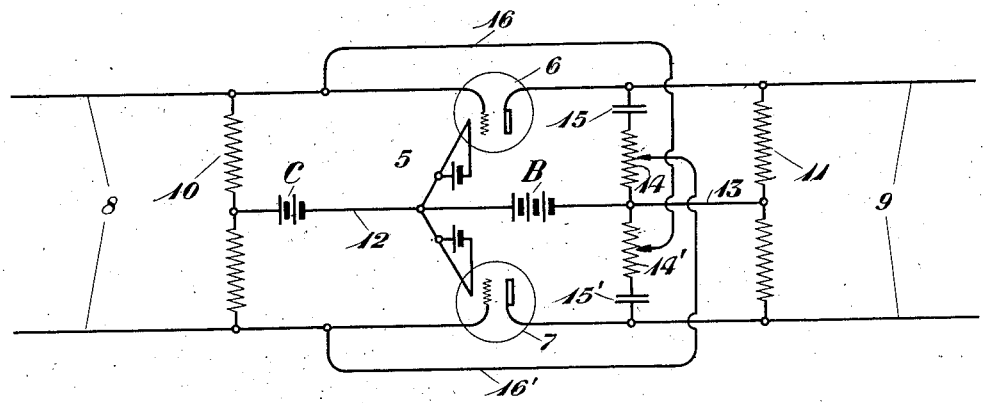

Nov. 1, 1927.

L. ESPENSCHIED

AMPLIFYING CIRCUIT

Filed April 7, 1920

1,647,216

INVENTOR
Lloyd Espenschied
BY
ATTORNEY

Patented Nov. 1, 1927.

1,647,216

UNITED STATES PATENT OFFICE.

LLOYD ESPENSCHIED, OF QUEENS, NEW YORK, ASSIGNOR TO AMERICAN TELEPHONE AND TELEGRAPH COMPANY, A CORPORATION OF NEW YORK.

AMPLIFYING CIRCUIT.

Application filed April 7, 1920. Serial No. 371,956.

This invention relates to signal transmitting systems and its object is to provide an amplifier for telegraph or other signals which shall be at once simple and efficient, particularly for the amplification of weak signals such as those received over ocean cables and which may at the same time serve to correct for the distortion of such signals.

In the accompanying drawing Figure 1 illustrates diagrammatically one form of the invention, Fig. 2 is a characteristic curve of the audion amplifier used to explain the operation of the invention and Figs. 3, 4 and 5 are modifications of the arrangement shown in Fig. 1.

Referring to Fig. 1, 5 represents generally a duplex amplifier of a type now well known in the art and consisting of two thermionic tubes 6 and 7, each having its grid connected to one side of the incoming line 8 and its plate connected to one side of the outgoing line 9. This connection is here shown as conductive, though it may, if desired, be inductive as will be obvious. Impedances 10 and 11 are connected respectively across the input and output circuits and serve to provide the middle or neutral point for the connection to the filament of the two tubes, the tubes having in the form here shown a conductor 12 common to the input circuits of the two tubes and the conductor 13 common to their output circuits, the conductor 12 running from the common filament connection to the center of impedance 10 and containing the common battery C, and conductor 13 running from the common filament connection to the center of impedance 11 and containing the common battery B. Each output circuit is also provided with an impedance paralleling its half of the impedance 11 and consisting in the form here shown of a resistance, 14—14', and a capacity, 15—15', connected in series. A feedback circuit, 16—16', for each tube is provided, being, as here shown, a conductor running in each from a point on the resistance (14' or 14) in the output circuit of one tube to the conductor leading to the grid of the adjacent tube. The connection between the conductors 16 and 16' and their respective resistances is preferably made adjustable as shown.

In a circuit such as described the tube will tend to oscillate if the amplification produced is sufficient to overcome the loss of the feedback circuit, and as illustrated in Fig. 1, the frequency at which it tends to oscillate is determined by the resistance and capacity of the circuit, and this is preferably at or near the frequency of the signal impulses. By adjustment of the "C" battery in conjunction with the feed-back coupling, the circuit can be made to oscillate or tend to oscillate at any point on the telegraph wave. The point on the telegraph wave for which the circuit is adjusted to oscillate depends upon the manner in which the currents are employed for signaling, i. e., as to whether the uni-directional or bi-directional impulses are employed, and also upon the manner in which it is desired to employ the amplifiers in the receipt or re-transmission of such signals.

Thus in Fig. 2 if the section of the curve $a$—$b$ represents the portion of maximum amplification, the "C" battery may be so adjusted that when no incoming signal current is present the tubes are adjusted to a point such as $c$. The slightest increment of signaling current will then suffice to increase the feed-back current sufficient to make the repeater or relay tend to oscillate and to thereby augment the normal amplification of the received current. This method of operation is applicable where the signaling transmission employs a uni-directional current, i. e., make and break, as per the common form of land telegraph system. The tube characteristic is preferably so adjusted in relation to the amplitude of the incoming signaling wave as to enable the latter in building up to its full value to carry the tube to the upper knee of the characteristic curve and to thereby prevent actual oscillation of the tube circuit after the wave has reached its maximum.

For telegraph systems employing bi-directional current, i. e., ± battery, the "C" battery is preferably so adjusted that with no signal current arriving the tubes would oscillate; that is, adjusted to normally operate on the section of the curve $a$—$b$. When no signals are being received the D. C. holding current normally imposed upon the line during the closed condition of the distant key, operates to bias the amplifier, carrying its operation on the characteristic curve to a point above or below the section $a$—$b$ and to thereby hold the amplifying circuit in the non-oscillating condition. When in the transmission of a signal the received current passes through zero, the tube is no longer restrained and tends to oscillate, and the amplification of the device to the very small currents bordering upon zero is thereby increased. The operation of the tube circuit in accordance with the adjustment just described is in a general way analogous to that of the well known vibrating relay when the vibrating feature is employed to increase the sensitivity of the relay.

If desired, the C battery may be so adjusted that with no signal current arriving the tubes would oscillate; that is, they may be adjusted to normally operate on the section of the curve a—b. Under this condition the signal current when imposed upon the tubes carries the operation of the tubes to a point above or below the section a—b of the curve thereby reducing the amplification sufficiently to suppress the oscillations. If the signal circuit is of the closed circuit type with current normally on the line, then the amplifier is normally held in the non-oscillating condition and is operated in a manner analogous to the well known vibrating relay.

It will be obvious that in either case the rapid building up of the output current by reason of the large amplification momentarily produced will have the effect of straightening up the front of the wave of the receiving signal, thus giving an improved wave form for recording or retransmitting purposes.

In the modification shown in Fig. 3 the frequency at which the tube tends to oscillate is controlled by a combination of capacity 20 and inductance 21 here shown as located in the common portion of the input circuit of the tubes, and the feed-back circuit 22—22' are shown connecting points on the impedances 10'—11' connected across the input and output circuits of the adjacent tube. Otherwise, the arrangement and the operation are the same as in Fig. 1.

In Fig. 4 the feed-back connection is inductive, being through the coils 24—24' in the output circuit which are inductively related to the coils 25—25' in the input circuits of the tubes. The coils 25—25' may in this case be connected across the input circuit as shown, thus replacing the impedance 10 of Fig. 1 and may also serve with the capacity 26 to determine the frequency at which the circuit tends to oscillate.

Fig. 5 differs from Fig. 4 only in the manner of connecting the feed-back circuit. Here again the connection is inductive, the coils 30—30' in the output circuits being in inductive relation to the coils 31 and 31' in the input circuits, but the coils 30 and 30' are here shown as connected to the common portion of the output circuit instead of in the separate portions of the output circuits as in Fig. 4.

If desired the tubes herein shown and described may be so adjusted by means of the C battery that the tendency to oscillate is present only after the signal has built up to a predetermined near-maximum value in which case the device will serve the purpose of interpolating or breaking up block signals as is sometimes done in ocean telegraphy where a series of dots for instance, is transmitted as a solid block signal which is divided into the proper number of dot signals at the receiving end by a mechanical vibrator or the like. Obviously the invention is not limited to the use of the duplex thermionic amplifier here shown by way of illustration, since the essential features of the operation will be present in the operation of any amplifier if connected and related to its signaling circuit as herein described.

Various modifications of the circuits herein shown and described may obviously be shown without departing from the spirit of the invention.

What I claim is:

1. In a signal receiving circuit, an amplifier for the received signals, and means to cause the amplification to vary for the different successive amplitude values of the incoming signal wave.

2. In a signal receiving circuit, an amplifier for the received signals having input and output circuits, and a feed-back connection between the input and output circuits, the constants of the circuits being so arranged that the degree of amplification varies for the different successive amplitude values of an incoming signal wave.

3. In a signal receiving circuit, an amplifier for the received signals and means to vary the degree of amplification for the different successive amplitude values of an incoming signal wave, the adjustments of the constants of the amplifier circuits being such as to produce maximum amplification at values of received current approaching zero.

4. In a signal receiving circuit, an amplifier for the received signals and means to vary the degree of amplification for the different successive amplitude values of an incoming signal wave, the adjustment of the constants of the amplifier circuits being such as to produce maximum amplification for increments of currents small relative to the maximum amplitude of the received signal.

In testimony whereof, I have signed my name to this specification this 6th day of April, 1920.

LLOYD ESPENSCHIED.